United States Patent
Saksa et al.

(10) Patent No.: US 6,749,707 B2
(45) Date of Patent: Jun. 15, 2004

(54) METHOD OF DEPOSITING ADHESIVES AND ADHESION CONTROL AGENTS

(75) Inventors: Thomas A. Saksa, Albany, OR (US); Shirley Lee, Poway, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 195 days.

(21) Appl. No.: 09/981,134

(22) Filed: Oct. 16, 2001

(65) Prior Publication Data

US 2003/0070740 A1 Apr. 17, 2003

(51) Int. Cl.⁷ .................... B32B 17/08; B32B 17/10
(52) U.S. Cl. .............. 156/99; 156/308.6; 428/426
(58) Field of Search ................ 156/99, 101, 104, 156/106, 182, 277, 306.6, 308.2, 308.6; 428/426

(56) References Cited

U.S. PATENT DOCUMENTS

| | | | |
|---|---|---|---|
| RE20,430 E | | 6/1937 | Morrison ................ 260/2 |
| 2,496,480 A | | 2/1950 | Lavin .................. 260/73 |
| 3,271,235 A | | 9/1966 | Lavin .................. 161/199 |
| 3,808,077 A | * | 4/1974 | Rieser et al. .......... 156/102 |
| 4,393,386 A | * | 7/1983 | Di Giulio .............. 347/4 |
| 5,657,875 A | | 8/1997 | Hirch, III ............ 206/767 |
| 5,681,757 A | | 10/1997 | Hayes ................. 437/7 |
| 5,736,195 A | * | 4/1998 | Haaland ............... 427/180 |
| 5,946,834 A | | 9/1999 | Bradley ............... 40/124.16 |

* cited by examiner

*Primary Examiner*—Curtis Mayes
*Assistant Examiner*—Sing P Chan

(57) ABSTRACT

A method of depositing adhesives or adhesion control agents using ink jet technology. The adhesive may be used in the manufacture of assembled paper products including greeting cards. The adhesion control agents may be deposited on a plastic sheet used in laminated safety glass.

11 Claims, 3 Drawing Sheets

METHOD OF DEPOSITING ADHESIVES AND ADHESION CONTROL AGENTS

BACKGROUND

The present invention relates to a method of depositing adhesives or adhesion control agents. More particularly, the present invention relates to a method of depositing adhesives or adhesive control agents that does not require contact with the surface upon which the material is being deposited.

Several techniques exist for the application of adhesives, most of which require direct contact between the surface receiving the adhesive and an applicator. Typically, automated applicators are used in order to facilitate current automated manufacturing processes. In many cases a special applicator must be designed and built for a particular manufacturing process. Most automated application processes are messy because the location of the adhesive cannot be accurately controlled.

The conventional adhesive application systems that have attempted to provide for accurate application of adhesives are slow and expensive. For example, in the greeting card industry there are special purpose cards produced with cut-outs, fold-outs, pop-ups, etc. The manufacturing of these cards requires that adhesives be applied in precise locations. However, the relatively limited manufacturing run of a single unique card makes many automated solutions too expensive. Furthermore, the typical contact type applicator does not work well when the adhesive needs to be applied to a very sensitive part, or to a material that is fuzzy or which might otherwise contaminate the applicator. In this situation the disadvantages of the traditional applicator are readily apparent.

Thus, there is a need for a fast and accurate deposition of adhesive in a no contact manner, at a low cost, and with easily modified amount and location, making it well suited for automated manufacturing.

There are also problems associated with the controlled deposition of adhesion control agents in a manufacturing environment. For example, consider the case of safety and security glasses. Security glasses are generally formed from two tempered glass plates that are autoclaved to adhere to a sheet of plastic located between the glass plates or sheets. The impact and shatter resistance of the resulting laminate depends greatly on the optimal control of the adhesion of the plastic sheet to the tempered glass. Too high or too low of a degree of adhesion of the sheet will decrease the impact and shatter resistance of the security glass. Precise and even distribution of an adhesion control agent on the surface of the plastic sheeting can result in optimal performance of the security glasses.

Gravure printing of the adhesion control agents has been considered. However, Gravure printing is capital intensive and prone to contamination.

Thus, there remains a need for an inexpensive method of depositing adhesion control agents that also reduces the likelihood of contamination.

SUMMARY OF THE INVENTION

The present invention allows for the fast and accurate deposition of adhesives in a no contact manner with one or more of the advantages of a low cost, an easily modified amount and location, making it well suited for automated manufacturing.

A method of manufacturing an assembled paper product is provided according to the present invention. The method includes the steps of providing a material to be formed into the product and providing an adhesive application device including an ink jet printing head and a reservoir containing adhesive. The method further includes depositing an adhesive onto a surface of a first portion of the material using the ink jet printing. The product is formed by bonding a second portion of the material to the first portion of the material using the adhesive deposited onto the first portion of the material. The position of the inkjet print head relative to the surface of material may be changed to deposit the adhesive in a desired location.

The adhesive may be deposited using a piezo-electric crystal to separate the adhesive into drops. Alternatively, the adhesive may be deposited using a thermal ink jet. In yet another alternative, the adhesive may be deposited using a continuous ink jet. Regardless of the type of ink jet used, the amount and thickness of the adhesive being deposited may be precisely controlled. The adhesive may be deposited in a line or other geometric shape depending on the particular card being constructed. The adhesive reservoir may be contained in a replaceable cartridge and the viscosity of the adhesive may be adjusted prior to depositing the adhesive.

According to an alternative embodiment of the present invention, a method of manufacturing safety glass is provided. The method includes the steps of providing a first and second sheet of glass and distributing an adhesion control agent onto a plastic sheet using an ink jet printing head. The method further includes positioning the sheet of plastic between the first and second sheets of glass and bonding the first and second sheets of glass to the sheet of plastic. The ink jet printing head may employ either thermal, continuous or piezo-electric ink jet printing methods.

Preferably, the step of bonding includes placing the glass and plastic sheets into an autoclave. The method also includes distributing the adhesion control agent uniformly over the plastic sheet. The plastic sheet may be formed by extrusion, and the adhesion control agent may be distributed after the plastic sheet exits an extrusion device. Either the plastic sheet or the ink jet print head may be moved in order to deposit the adhesion control agents as required on the plastic sheet. The control agents may be deposited on both sides of the sheet.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

The present invention relates to using ink jet technology to deposit adhesives or adhesion control agents onto a surface. Ink jet printing is a non-impact method for producing images by the deposition of ink droplets on a substrate (paper, transparent film, fabric, etc.) in response to digital signals. Ink jet printers have found broad applications across markets ranging from industrial labeling to short run printing to desktop document and pictorial imaging.

The basic principle of inkjet technology is to dispense small droplets of ink through small tubes or nozzles. The placement of each drop of ink may be controlled electronically, preferably by a computer. Printing is accomplished by moving either the surface receiving the ink or the printing head. Ink jet technology may be divided into the following basic types: piezo-electric; thermal; and continuous.

Piezo-electric ink jet printing refers to a method in which the ink drops are squeezed mechanically out of the print head by piezoelectric elements. Bubble or thermal ink jet printing refers to the method in which the ink is heated and explodes as a bubble through the nozzle of the print head. In continuous ink jet printing a constant flow of ink drops is fired by a pump through the nozzle of the print head. An electrostatic deflector may by used to ensure correct placing of the drops on the surface and may also deflect unused drops for reuse.

Figure 1:
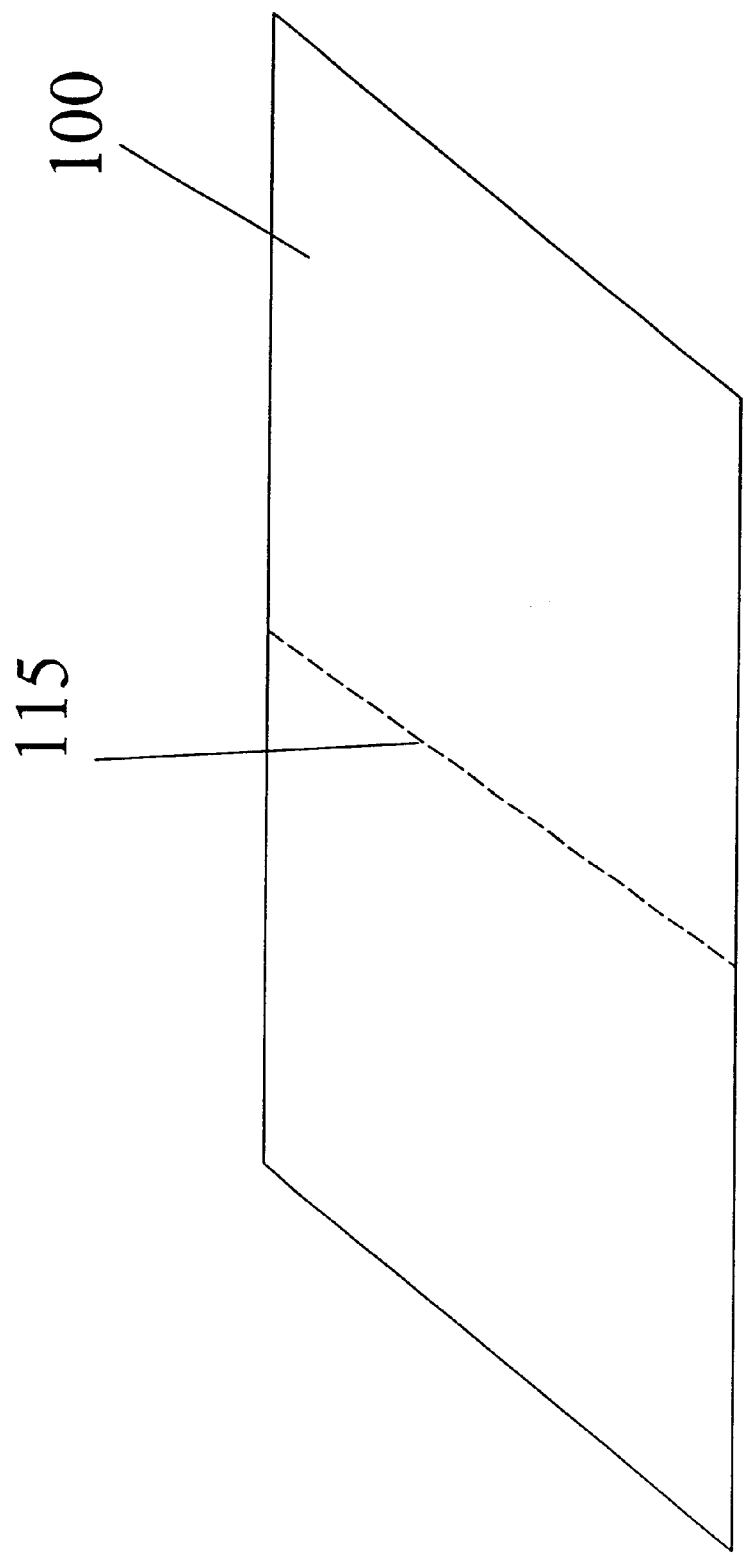
FIG. 1 is a schematic view of a blank for assembly into a special purpose card according to the method of the present invention.

FIG. 1 shows a blank 100 of material that may be assembled into a paper product according to the method of the present invention. These paper products may include, for example, greeting cards, pop-up cards, brochures, Chinese lanterns, cardboard boxes, or other paper or cardboard type products that have glued or bonded surfaces. U.S. Pat. Nos. 5,946,834 and 5,657,875, incorporated by reference herein in their entirety, disclose examples of these special purpose cards.

As shown in FIG. 1, the material 100 includes a line of adhesive 115. Although only a line of adhesive is shown, the method of the present invention is not limited to depositing adhesives onto the material in a linear or curved manner. The present invention may cover the material in any manner specified including, for example, pinpoint deposition or wide area coverage.

Figure 2:
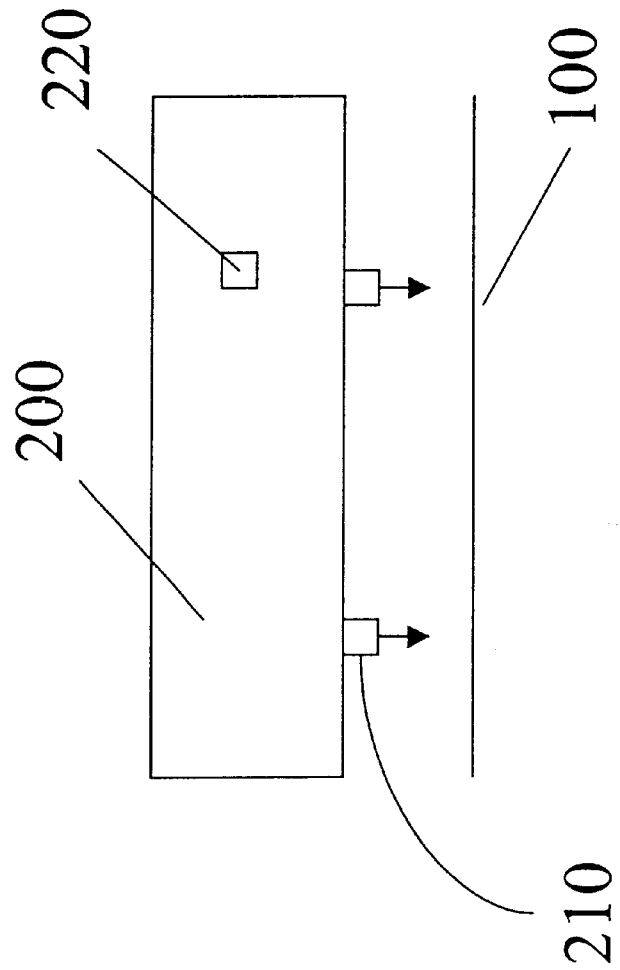
FIG. 2 is a schematic view of a system for manufacturing a special purpose card according to the method of the present invention.

The inventors have recognized that adhesives or adhesion control agents may be deposited using ink jet technology. The present invention provides for depositing the adhesive onto the material 100 using an ink jet type printing device 200, as shown in FIG. 2. The printing device 200 includes a print head 210 and a reservoir 220 for retaining the adhesive to be deposited out of the print head. The adhesive should be of generally low viscosity. Preferably, the viscosity of the adhesive would be the same or very similar to water. The viscosity of the adhesive may be adjusted as necessary to provide for improved deposition. Preferably, a water based adhesive such as cellulose paste is used. Alternatively, a water based glue thinned to a viscosity similar to that of water (approximately 800–1200 $\mu$Pa s) may be used. Preferably, the deposition process is carried out in at a temperature in a range from about 20 degrees C. to about 70 degrees C. This temperature range is preferred because most existing inkjet print heads are designed for home or office use. The temperature range may be expanded if needed by adapting the print heads to industrial environments.

The amount and location of the adhesive can be precisely controlled in the same manner used for controlling ink delivery in a printing application. The width of the swath can be accurately controlled and the flow can be started and stopped with higher precision than most mechanical systems currently in use. The thickness or amount of adhesive applied to any given area is controlled both by the physical attributes of the print head, and the way it is used. For example, the size of the print head's orifice and the dimensions of the print head firing chamber can produce different drop sizes. In addition, the number of drops printed in any area can also be controlled by changing the firing frequency or adjusting the advance rate of the print head relative to the surface of the material. A thicker deposit of adhesive can also be obtained by printing several passes over an area. These techniques are currently in use for printing different shades of color, and to change the amount of ink and allow printing on different types of media. The process may be easily employed in an automated manufacturing system that utilizes readily available computer control technology. The present invention may utilize ink jet cartridges to deposit the adhesives in the same manner as ink is deposited in a commercial inkjet printer.

In another embodiment of the present invention, inkjet technology is used to deposit precise, minute and evenly distributed micro-dots of adhesion control agents on plastic sheetings, such as extruded polyvinyl butyral sheets. The adhesion control agents prevents adhesion to the plastic sheet at the point where the agent is deposited. These plastic sheets in turn are used in security glasses.

Security or safety glass is generally formed from two tempered glass plates that are autoclaved to adhere to a piece of plastic sheeting located between the glass sheets. The impact and shatter resistance of the laminates depends greatly on the optimal control of the adhesion of the plastics sheet to the tempered glass. Too high or too low of a degree of adhesion of the sheet will decrease the impact and shatter resistance of the security glass. Precise and even distribution of an adhesion control agent on the surface of the plastic sheeting is required in order to ensure optimal performance of the security glass.

Safety glass is typically used in automobile windshields or building structures. Safety glass preferably comprises two sheets of glass bonded to an interlayer of plasticized polyvinyl butyral. Polyvinyl butyral interlayers are well known in the art and these interlayers and processes for their preparation are described in U.S. Pat. No. Re. 20,430, and U.S. Pat. Nos. 2,496,480 and 3,271,235 which are hereby incorporated by reference. Such interlayers are commercially available under the trademarks Saflex® and Butacite®.

According to the present invention, adhesion control agents for polyvinyl butyral such as a vinyl acetate copolymer, polyvinyl alcohol can be deposited uniformly in very minute quantity on to the polymer sheet by printing the adhesion control agents on the polymer sheet using ink jet technology. Using ink jet technology to dispense industrial fluids in two dimensions in a very precise manner is much less capital intensive than current practice, namely large-scale dilution and compounding. The industrial fluid is delivered to the desired location without waste.

Figure 3:
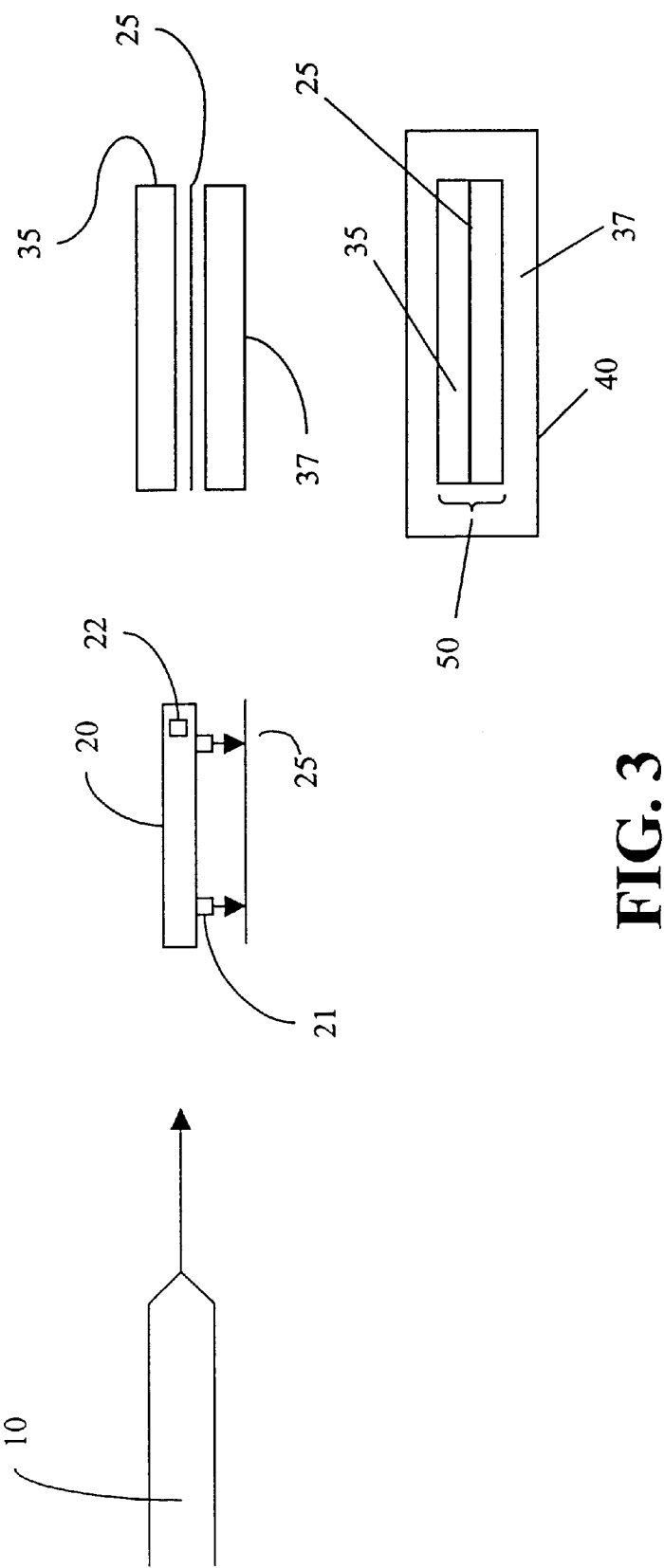
FIG. 3 is a flow chart showing the method of manufacturing safety glass according to the present invention.

FIG. 3 discloses a process for manufacturing safety glass according to the present invention. The plastic interlayer 25 is formed in an extruder 10. Adhesion control agents are deposited on the plastic sheet 25 by an ink jet printer 20. The printer 20 may include a reservoir 22 for storing the adhesion control agent. Alternatively, the printer 20 may employ conventional cartridges containing the control agent. The printer 20 includes an ink jet print head 21 that may employ any of the conventional printing techniques described above including, for example, piezo-electric, continuous or thermal. The position of the plastic sheet with regard to the print head may be varied by moving either the print head or the plastic sheet. As described above, with regard to the adhesive on the special purpose cards, the adhesion control agents may be deposited in any desired pattern. In addition, it is within the scope of the present invention to deposit the adhesion control agents on one or both sides of the plastic sheet in order to improve the quality of the safety glass. There is no contact between the printer 20 and the sheet. Thus, the chance of contamination is minimized.

After the adhesion control agent is deposited, the plastic sheet 25 is positioned between two sheets of glass 35, 37. The glass 50 is placed in an oven 40 to bond the glass and the plastic sheets together. Preferably, the oven 40 is an autoclave in which the precise conditions of temperature and pressure may be controlled.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A method of depositing an adhesion control agent in a manufacturing process for safety glass comprising the steps of:
    (a) providing a first and second sheets of glass;
    (b) evenly distributing micro-dots of adhesion control agent on a plastic sheet using an ink jet printing head, the adhesion control agent preventing adhesion to the plastic sheet at the point where the adhesion control agent is deposited;
    (c) positioning the sheet of plastic between the first and second sheets of glass; and
    (d) bonding the first and second sheets of glass to the sheet of plastic.

2. The method of claim 1, wherein the step of bonding includes placing the glass and plastic sheets into an autoclave.

3. The method of claim 1, wherein the step of distributing includes distributing the adhesion control agent uniformly over the plastic sheet.

4. The method of claim 1, further comprising the step of extruding plastic to form the plastic sheet.

5. The method of claim 4, wherein the adhesion control agent is distributed after the plastic sheet exits an extrusion device.

6. The method of claim 1, wherein the step of distributing the adhesion control agent includes using a using a piezoelectric crystal to separate the adhesion control agent into drops.

7. The method of claim 1, wherein the step of distributing the adhesion control agent includes moving the plastic sheet relative to the ink jet print head.

8. The method of claim 1, wherein the step of distributing includes controlling the amount of the adhesion control agent deposited on the plastic sheet.

9. The method of claim 1, wherein the step of distributing the adhesion control agent includes depositing the adhesion control agent onto both sides of the plastic sheet.

10. A method of depositing an adhesion control agent in a manufacturing process comprising the steps of:
    providing a first material and a second material to be bonded together; and
    depositing an adhesion control agent onto at least one of the first and second materials using an ink jet printing head, wherein
    the depositing step includes evenly distributing micro-dots of adhesion control agent on a plastic sheet using an ink jet printing head, the adhesion control agent preventing adhesion to the plastic sheet at the point where the adhesion control agent is deposited.

11. The method of claim 10, further comprising the step of bonding the first and second materials together in an autoclave.

* * * * *